United States Patent [19]

Lauterbach

[11] 4,449,397

[45] May 22, 1984

[54] APPARATUS FOR MEASURING THE MASS OF A PULSATING MEDIUM FLOWING IN A FLOW CROSS-SECTION

[75] Inventor: Heinz Lauterbach, Esslingen, Fed. Rep. of Germany

[73] Assignee: Robert Bosch GmbH, Stuttgart, Fed. Rep. of Germany

[21] Appl. No.: 408,979

[22] Filed: Aug. 17, 1982

[30] Foreign Application Priority Data

Sep. 10, 1981 [DE] Fed. Rep. of Germany ....... 3135794

[51] Int. Cl.³ .............................................. G01F 1/68
[52] U.S. Cl. ........................................ 73/118; 73/204
[58] Field of Search ......................... 73/118, 204, 202; 123/494

[56] References Cited

U.S. PATENT DOCUMENTS 4,264,961  4/1981  Nishimura et al. ................ 73/204 X
4,404,846  9/1983  Yamauchi et al. .................... 73/118

Primary Examiner—Jerry W. Myracle
Attorney, Agent, or Firm—Edwin E. Greigg

[57] ABSTRACT

An apparatus for measuring the mass of a pulsating medium flowing in a flow cross-section, in particular for measuring the aspirated air mass of internal combustion engines. The apparatus includes a temperature-dependent measuring resistor, whose temperature and/or resistance is regulated in accordance with the mass of a flowing medium. The measurement signal ($U_S$) representing the mass of the medium can be influenced in accordance with the flow direction by use of a pressure-sensing element which has corresponding electrical contacts and when there is a flow reversal the pressure-sensing element, via a correction circuit, suppresses the delivery of the measurement signal ($U_S$) to an electronic control unit. By use of the correction circuit it is also possible to subtract the amount measured during a reverse flow from the measurement signal made during flow in the desired flow direction. As a result, an error in the measurement signal ($U_S$) during pulsating flow is prevented.

7 Claims, 3 Drawing Figures

APPARATUS FOR MEASURING THE MASS OF A PULSATING MEDIUM FLOWING IN A FLOW CROSS-SECTION

BACKGROUND OF THE INVENTION

The present invention relates to an apparatus for measuring the mass of air aspirated by an internal engine and more particularly to an apparatus for measuring the mass of a pulsating medium flowing in a flow cross section.

An apparatus is already known which measures the mass of air aspirated by an internal combustion engine, the measurement signal includes an error caused by the fact that the apparatus also ascertains the mass of the air flowing backward in the intake tube of the internal combustion engine because of pulsation, and adds this mass as a positive amount to the mass of aspirated air.

OBJECT AND SUMMARY OF THE INVENTION

The apparatus according to the present invention has the advantage over the prior art that the mass of medium flowing in the desired flow direction is ascertained correctly, and errors in the measurement signal caused by a flow reversal are prevented.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
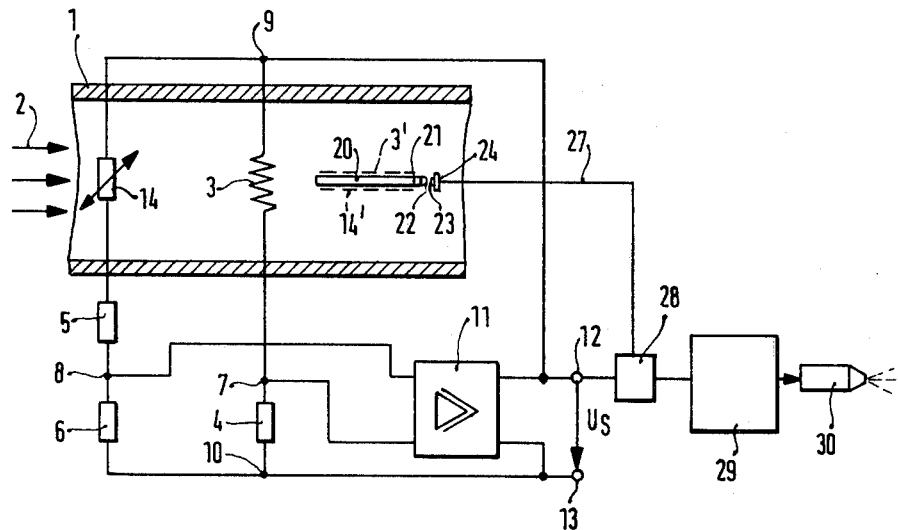
FIG. 1 is a circuit diagram for an apparatus for measuring the mass of a flowing medium having a pressure-sensing element for correcting the measurement signal in the event of a pulsating flow.

In FIG. 1, a flow tube 1 shown in cross section shows, by way of example, an air intake tube of an internal combustion engine (not shown). A medium flows through the tube, for example, the air aspirated by the engine, in the direction of the arrows 2. A temperature-dependent measuring resistor 3, for example, a hot-layer or hot-film resistor or a hot wire is located in the intake tube and is subjected to the flowing medium and to the output value of a regulator or controller and simultaneously furnishes the input value for the regulator or controller in accordance with air flow. The temperature of the temperature-dependent measuring resistor 3 is set by the regulator to a fixed value, which is above the average air temperature. Now if the flow velocity, that is, the mass of medium aspirated per unit of time, increases, then the temperature-dependent measuring resistor 3 cools down to an increased extent. This cooling is fed back to the input of the regulator, so that the regulator elevates its output variable such that the fixed temperature value at the temperature-dependent measuring resistor 3 is re-established. The output variable of the regulator regulates the temperature of the temperature-dependent measuring resistor 3 in the event of changes in the aspirated mass of medium to the predetermined value and simultaneously represents a standard for the aspirated mass of medium, which can be delivered as a measurement signal to a metering circuit, for example, of an internal combustion engine in order to adapt the required mass of fuel to the mass of air aspirated per unit of time.

The temperature-dependent measuring resistor 3 is disposed in a resistance-measuring circuit, for instance, a bridge circuit, and with a resistor 4 together forms a first bridge branch, with a second bridge branch comprising the two fixed resistors 5 and 6 being switched in parallel to it. The pick-up point 7 is located between resistors 3 and 4 and the pick-up point 8 is located between resistors 5 and 6. The two bridge branches are switched in parallel in points 9 and 10. The diagonal voltage of the bridge appearing between points 7 and 8 is fed to the input of an amplifier 11, the output of the amplifier 11 is directed through lines to the output terminals of which points 9 and 10 are connected, so that the output variable of this amplifier 11 supplies the bridge with an operating voltage or an operating current. The output variable, which is designated as the control variable $U_S$, can be picked up between the terminals 12 and 13, as indicated in FIG. 1.

The temperature-dependent measuring resistor 3 is heated up by the current flowing through it to a value at which the input voltage of the amplifier 11 is set, that is, the bridge diagonal voltage, becomes zero or assumes a predetermined value. A specific current then flows from the output of the amplifier into the bridge circuit. If, as a result of changes in the mass of the flowing medium, the temperature of the temperature-dependent measuring resistor 3 varies, then the voltage at the bridge diagonal varies as well, and the amplifier 11 regulates the bridge supply voltage or the bridge current to a value at which the bridge is again balanced or is imbalanced in a predetermined manner. The output variable of the amplifier 11, that is, the control voltage $U_S$, like the current in the temperature-dependent measuring resistor 3, represents a measurement signal for the mass of flowing medium, for instance, the mass of air aspirated by an engine.

In order to compensate for the influence of temperature of the medium on the resultant measurement, it may be efficacious to include a second resistor 14 in the second bridge branch, this second resistor also being surrounded by the flow of the medium. The dimensions of the resistors 5, 6 and 14 should be selected such that the power loss of the temperature-dependent resistor 14, which is caused by the branch current flowing through it, is low enough that the temperature of this resistor 14 virtually does not vary when there are changes in the bridge voltage, but rather always corresponds to the temperature of the medium flowing past it.

Parallel to the flow direction 2, a plate-like carrier body 20 is disposed in the flow cross section 1, experiencing the flow of the medium and having a fixed electrical contact 22 disposed at its end 21 down-stream or remote from the flow direction 2. A movable electrical counterpart contact 23 cooperates with the fixed contact 22; the counterpart contact 23 is disposed by way of example on a tongue spring 24 fastened in place at the other end and when there is a flow of medium in the desired flow direction 2 or an interruption of the flow this counterpart contact 23 is held at a distance from the contact 22 as a result of the spring action of the tongue spring 24.

Figure 2:
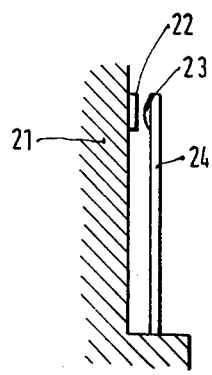
FIG. 2 is a side view of a pressure-sensitive element for correcting the measurement signal in the event of a pulsating flow.

In FIG. 2, a side view of the pressure-sending element 22, 23, 24 of FIG. 1 is shown. The spring force of the tongue spring 24 could also be supplemented by an additional compression spring, which is, however, not shown, such that the compression spring tends to keep the contacts 22, 23 apart.

Figure 3:
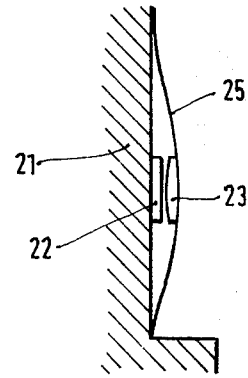
FIG. 3 shows a further embodiment of a pressure-sensing element for correcting the measurement signal in the event of a pulsating flow.

In FIG. 3, a further embodiment of a pressure-sensing element with the contacts 22, 23 is shown, and the counterpart contact 23 is disposed on a pressure-sensing diaphragm 25, which is held in place at its periphery. The restoring force in this embodiment can be generated by the fastening of the diaphragm 25, which has the tendency to keep the contacts 22, 23 apart.

The contacts 22, 23 are contained in an electrical current circuit, which leads via a line 27 to a correction circuit 28, which, by way of example, has a switching function and is located at the output of the amplifier 11, which furnishes the measurement signal $U_S$ corresponding to the mass of the flowing medium; at the other end, the correction circuit 28 is connected with the input of an electronic control unit 29 of known design, which by way of example is part of an electronic fuel injection system and triggers electromagnetic fuel injection valves 30.

In accordance with the invention, the pressure-sensing element 22, 23, 24, 25 is embodied such that when there is a flow occurring in the desired flow direction 2, the contacts 22, 23 do not touch each other; as a result, the correction circuit 28 permits the measurement signal $U_S$, representing the flowing mass of medium, to reach the electronic control unit 29 unchanged, while if there is a reversal in the flow direction of the medium counter to the flow direction 2, the backed-up pressure engaging the tongue spring 24 or the diaphragm 25 causes a closure of the contacts 22, 23. As a result, the correction circuit 28 is controlled such that it prevents the measurement signal $U_S$ from being carried further to the electronic control unit 29; that is, if there is a flow direction of this kind the measurement signal $U_S$ is suppressed by the correction circuit 28, or the correction circuit 28 subtracts the measured amount in this event from the measurement signal that was ascertained when the flow was in the desired direction 2. Thus, even when there is a pulsating flow, the apparatus according to the invention permits the ascertainment of a correct measurement signal, corresponding to the flowing mass of medium, without any error component caused by the pulsation.

The pressure-sensing element 22, 23, 24, 25 represents a spring/mass system, whose inherent frequency is efficaciously selected such that it is approximately equal to the pulsation frequency of the flowing medium. The measuring resistor 3 may, by way of example, also be disposed on the other side of the carrier body 20 in the flow direction in the form of a hot-film or hot-layer resistor 3', while the resistor 14 can be disposed on the other side of the carrier body 20 in the form of a film or layer resistor 14'.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for measuring the aspirated air mass of internal combustion engines, which represents a pulsating flowing medium, comprising at least one temperature-dependent measuring resistor disposed in the flow cross-section, the temperature and resistance of which is regulated in accordance with the flowing mass and a regulator output measurement signal ($U_S$), a pressure-sensing element which is subjected to the flow medium, said pressure-sensing element producing an output which influences the measurement signal ($U_S$) representing the flowing mass of medium in accordance with the direction of flow of the medium.

2. An apparatus as defined by claim 1, in which said pressure-sensing body includes a carrier body disposed in the the flow of medium, an electrical fixed contact disposed on an end of said carrier body downstream of the flowing medium a movable electrical counterpart contact positioned to cooperate with said fixed contact counter to a restoring force such that when there is a flow of medium in the desired flow direction the fixed contact and said counterpart contact are separated from one another by means of the restoring force and when there is a flow of medium taking place counter to the desired flow direction, the force acting upon the counterpart contact as a result of the backed-up pressure brings the counterpart contact to rest against the fixed contact counter to the restoring force.

3. An apparatus as defined by claim 2, in which the counterpart contact is disposed on a movable end of a tongue spring fastened on one end of said carrier body.

4. An apparatus as defined by claim 2, in which the counterpart contact is disposed on a diaphragm.

5. An apparatus as defined by claim 1 in which the pressure-sensing element has an inherent frequency which is approximately equal to the pulsation frequency of the medium flow.

6. An apparatus as defined by claim 1, 2, 3, 4 or 5 in which the influence exerted on the measurement signal ($U_S$) by the pressure-sensing element is effected such that at a pressure of the medium which characterizes a medium flow occurring counter to the desired flow direction of the medium, the measured amount is subtracted from the measurement signal of the desired medium flow direction.

7. An apparatus as defined by claim 1, 2, 3, 4 or 5 in which the influence exerted on the measurement signal ($U_S$) by the pressure-sensing element is effected such that at a pressure of the medium which characterizes a medium flow occurring counter to the desired flow direction of the medium, the measurement signal ($U_S$) is suppressed.

* * * * *